United States Patent [19]

Erickson

[11] Patent Number: 5,718,188

[45] Date of Patent: Feb. 17, 1998

[54] ANIMAL FEED MANAGEMENT SYSTEM

[76] Inventor: Roy L. Erickson, 18995 N. 2300 Ave., Geneseo, Ill. 61254-8771

[21] Appl. No.: 530,546

[22] Filed: Sep. 19, 1995

[51] Int. Cl.$^6$ ................................................ A01K 5/02
[52] U.S. Cl. ................ 119/57.92; 119/56.2; 119/57.7
[58] Field of Search ..................... 119/51.02, 56.1, 119/56.2, 57.1, 57.7, 57.92

[56] References Cited

U.S. PATENT DOCUMENTS

| | | | |
|---|---|---|---|
| 2,970,532 | 2/1961 | Skelton | 119/57.1 |
| 3,822,056 | 7/1974 | Hawes, Jr. et al. | 119/57.1 |
| 4,981,107 | 1/1991 | Beaudon et al. | 119/56.2 |
| 5,069,165 | 12/1991 | Rousseau | 119/51.02 |
| 5,105,767 | 4/1992 | Gordon et al. | 119/57.92 |

FOREIGN PATENT DOCUMENTS

| | | | |
|---|---|---|---|
| 2598593 | 11/1987 | France | 119/57.1 |
| 641935 | 1/1979 | U.S.S.R. | 119/57.92 |

*Primary Examiner*—Todd E. Manahan
*Attorney, Agent, or Firm*—Lyon & Lyon LLP

[57] ABSTRACT

A computer controlled hog feed management system which utilizes two or more pre-ground and premixed rations which may be blended into feed and delivered to feed drops according to the animals' specific needs based on gender, weight, and average daily feed intake. Animal locations and feed requirements are entered into a computer which controls two or more ration transfer augers for the transfer of the previously prepared rations to a plurality of feeding stations, preferably after first passing through a blending hopper. The system utilizes auger transfer rates to determine proper feed blends and auger transfer rates and delivery distances to determine auger run times and feed drop on-off status for feed delivery to particular locations.

5 Claims, 1 Drawing Sheet

ANIMAL FEED MANAGEMENT SYSTEM

TECHNICAL FIELD

This invention relates to feeding systems for animals, and more particularly to computer controlled systems for the management, control, and delivery of feed to hogs.

BACKGROUND ART

Automated feeding systems for animals, and hogs in particular, are well known in the art. One of the more basic systems utilizes two feed storage bins, A and B, each of which contains a premixed, complete feed and which are connected to several feed drops by means of an electrically driven auger. The operator first opens those drops for feeders he desires to fill from storage bin A. When the auger is then activated, it is filled with feed which is transferred from storage bin A to each open drop sequentially along the auger. As each feeder is filled, the feed is transferred to the next open drop until all selected feeders are filled. When all opened feeders are filled from bin A, the operator opens the remaining closed drop valves and fills these feeders from storage bin B.

One of the more sophisticated systems comprises eight feed component storage bins, each having an auger for delivery of that component to a weighing unit. Predetermined weights of each component are weighed out, ground, mixed, and then transferred by auger to a multitude of feed drops. This system is controlled by a computer which also maintains records of the feed processed.

DISCLOSURE OF THE INVENTION

The present invention discloses a computer controlled hog feed management system which utilizes two or more pre-ground and premixed rations which may be blended into feed and delivered to feed drops according to the animals' specific needs based on gender, weight, and average daily feed intake. Animal locations and feed requirements are entered into a computer which controls two or more ration transfer augers for the transfer of the previously prepared rations to a plurality of feeding stations, preferably after first passing through a blending hopper. The system utilizes auger transfer rates to determine proper feed blends and auger transfer rates and delivery distances to determine auger run times and feed drop on-off status for feed delivery to particular locations.

BEST MODE FOR CARRYING OUT THE INVENTION

Figure 1:
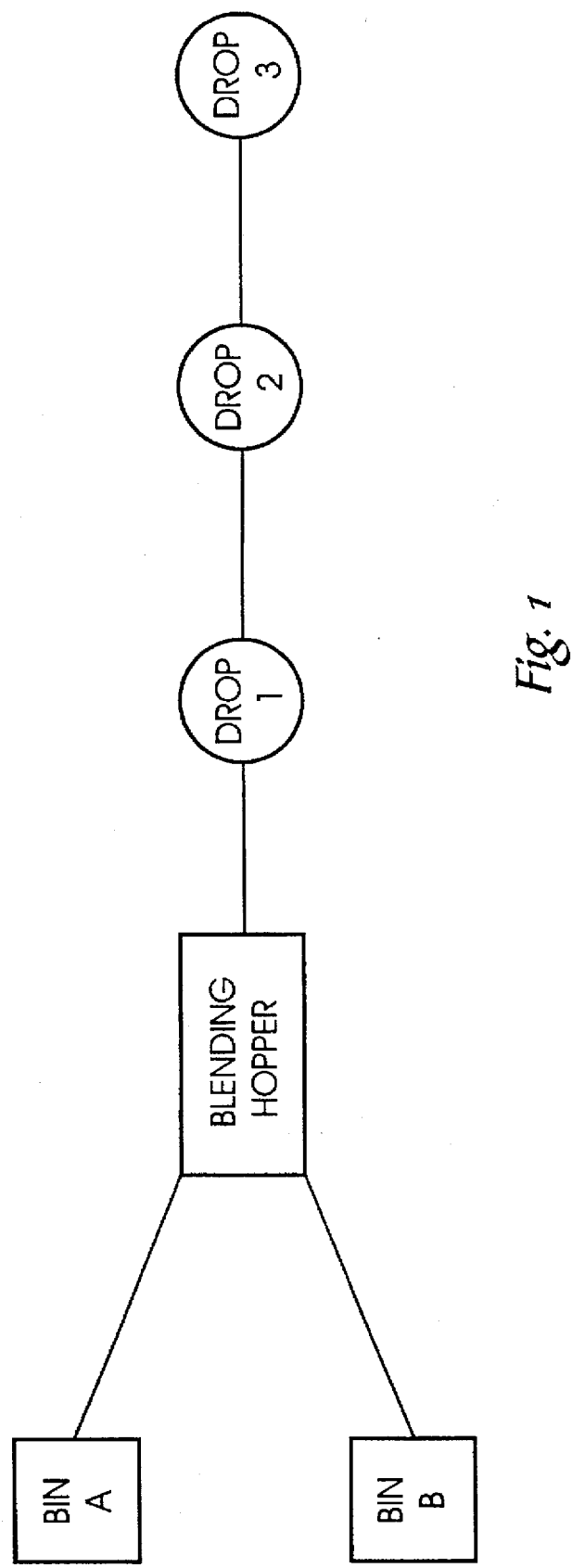
FIG. 1 is a block diagram of the present invention.

The method and apparatus of the hog feed management system of this invention utilize two or more premixed rations which may be blended together to create feeds as determined by the specific needs of the animals based on gender, weight, and average daily food intake. For the sake of simplicity, the following description will be limited to only two premixed rations, although it will be readily apparent to one skilled in the art that the use of a greater number of premixed rations is possible.

A first exemplary premixed ration, denoted as Ration A, is comprised of the following components and is stored in a first ration storage bin denoted in FIG. 1 as Bin A:

| Ration A | |
|---|---|
| Premix | 3.75% |
| 48% Soybean Meal | 32.5% |
| Grain | 63.75% |

A second exemplary premixed ration, denoted as Ration B, is comprised of the following components and is stored in a second storage bin denoted in FIG. 1 as Bin B:

| Ration B | |
|---|---|
| Premix | 3% |
| 48% Soybean Meal | 11.25% |
| Grain | 85.75% |

These premixed rations may then be blended according to the following table to create Feeds 4 through 17:

| Feed | Ration A | Ration B |
|---|---|---|
| 4 | 100% | 0% |
| 5 | 95% | 5% |
| 6 | 87.5% | 12.5% |
| 7 | 75% | 25% |
| 8 | 68.75% | 31.25% |
| 9 | 60% | 40% |
| 10 | 50% | 50% |
| 11 | 40% | 60% |
| 12 | 30% | 70% |
| 13 | 25% | 75% |
| 14 | 22.5% | 77.5% |
| 15 | 11.25% | 85.75% |
| 16 | 5% | 95% |
| 17 | 0% | 100% |

Feeds 1 through 3 are special blends for young pigs and would ordinarily utilize a third bin, the contents of which would be mixed with Ration A.

Which particular feed to be delivered to each hog is determined from the following table:

FEED TO BE FED BASED ON FEED INTAKE
INTAKE FEEDING GUIDELINES FOR LEAN GENETICS

| WEIGHT RANGE | 40–80 | 80–120 | 120–MKT | | |
|---|---|---|---|---|---|
| ADFI | ALL | ALL | BARROWS | MIXED | GILTS |
| 2.30–2.66 | 1 | | | | |
| 2.67–3.00 | 3 | | | | |
| 3.01–3.33 | 4 | 2 | | | |
| 3.34–3.66 | 6 | 3 | | | |
| 3.67–4.00 | 8 | 5 | | | |
| 4.01–4.33 | 9 | 7 | 6 | 5 | 4 |
| 4.34–4.66 | 10 | 8 | 7 | 6 | 5 |
| 4.67–5.00 | 11 | 9 | 8 | 7 | 6 |
| 5.01–5.33 | | 10 | 10 | 9 | 8 |
| 5.34–5.66 | | 11 | 11 | 10 | 9 |
| 5.67–6.00 | | 12 | 12 | 11 | 10 |
| 6.01–6.33 | | | 13 | 12 | 11 |
| 6.34–6.66 | | | 14 | 13 | 12 |
| 6.67–7.00 | | | 15 | 14 | 13 |
| 7.01–7.33 | | | 16 | 15 | 14 |
| 7.34–7.66 | | | 16 | 15 | 14 |
| 7.67–8.00 | | | 17 | 16 | 15 |
| 8.01–8.33 | | | 17 | 17 | 16 |
| OVER 8.34 LBS | | | 17 | 17 | 17 |

Referring to the block diagram portrayal of the invention of FIG. 1, Ration A is stored in a first Bin A, while Ration B is stored in a second Bin B. In the preferred embodiment, each of the two storage bins A and B is connected to a blending hopper by means of its respective transfer auger. The blending hopper may of course be eliminated in a simplified embodiment in which the transfer augers deliver the rations directly into the delivery auger. Since the transfer rates of the two transfer augers are known, it is a simple matter to transfer a given amount of each ration to the blending hopper (or directly to the delivery auger) by controlling the run times of the transfer augers. For example, if the transfer rate of each of the transfer augers from Bins A and B is one pound per second, and 200 pounds of Feed 10 are needed, each transfer auger must run for one hundred seconds. If 300 pounds of Feed 7 are needed, total auger run time will be 300 seconds, with auger A on for 75% of that time, or 225 seconds, and auger B on for 25% of that time, or 75 seconds.

Referring again to FIG. 1, after a specified feed is blended in the blending hopper, it is transferred to selected feed drops by means of a delivery auger which runs continuously until all selected drops have been serviced. FIG. 1 depicts three feed drops for purposes of explanation, although of course many more feed drops can be accommodated with this invention. Each of the feed drops utilizes a computer controlled, pneumatic valve to open and close the drop.

The transfer of feed to each selected drop is a function of four variables: (1) the quantity of feed to be sent to the drop, (2) delivery auger flow rate, (3) delivery auger linear velocity, and (4) distance from the blending hopper to the drop. For explanation only, assume that the 300 pounds of Feed 7 mixed above is to be transferred to drop 1 and the particular embodiment of the invention has the following parameters:

| | |
|---|---|
| (1) feed to be transferred to drop 1 | 300 lbs. |
| (2) delivery auger flow rate | 1 lb. per second |
| (3) delivery auger linear velocity | 1 foot per second |
| (4) distance from hopper to drop 1 | 15 feet |

The 300 pounds of feed will be removed from the blending hopper by the delivery auger in 300 seconds. The last of the feed to enter the delivery auger will then require an additional 15 seconds to reach drop 1. Thus the total delivery auger run time for this operation would be 315 seconds. As the feed drops are preferably fed sequentially, the shut-off valves for all drops can initially be open. Continuing with the above example, the drop 1 valve will then close after 315 seconds to allow the feed to pass on to drop 2. When the blending bin is empty, a new feed may be mixed by engaging augers A and B for selected times depending on the particular feed blend required for the next series of feed drops. This process can continue indefinitely, blending and delivering different feeds to selected feed drops until all locations have been serviced.

The computer controller for the feed blending and delivery system also stores auger run times and shut-off valve status to compute the amount of each ration delivered to each feeder, as well as totals and other information which may be required.

Obviously, many modifications and variations of the present invention are possible in light of the above teachings. It is therefore to be understood that, within the scope of the appended claims, the invention may be practiced otherwise than as specifically described above.

What is claimed is:

1. A feed management system for animals, comprising:

(a) a plurality of premixed feed rations stored in respective ration storage bins;

(b) a plurality of ration transfer augers operably connected to said ration storage bins;

(c) a stationary feed delivery auger operably connected to said ration transfer augers at a location on said feed delivery auger and having a plurality of feed drops connected thereto; and (d) means for determining and controlling auger run times and feed drop status based on animal feed requirements, auger transfer rates, and auger transfer distances from said location on said feed delivery auger to each of said feed drops.

2. The feed management system as recited in claim 1, further comprising a blending hopper operably situated between said ration transfer augers and said feed delivery auger.

3. A method for selectively feeding animals at a plurality of feeding stations, comprising the steps of:
 (a) providing a plurality of premixed feed rations stored in respective ration storage bins and a plurality of ration transfer augers operably connected to said rotation storage bins;
 (b) transferring said rations to a stationary delivery auger operably connected to said ration transfer auger wherein they are combined to create a feed at a location on said feed auger;
 (c) delivering said feed to selected feed drops based on animal feed requirements, auger transfer rates and auger transfer distances from said location on said feed auger to each of said feed drops.

4. The method as recited in claim 3 wherein the transferring and delivering steps further comprise the steps of engaging ration transfer augers and a feed delivery auger for periods of time based on animal feed requirements, auger transfer rates, and auger transfer distances.

5. The method as recited in claim 3, further comprising the step of transferring said rations to a blending hopper before transfer to said delivery auger.

* * * * *